United States Patent
Yaney et al.

(10) Patent No.: US 10,509,298 B2
(45) Date of Patent: Dec. 17, 2019

(54) OPTICAL DEVICE WITH ELECTROCHROMIC LENS CAP

(71) Applicant: Roo, Inc., New York, NY (US)

(72) Inventors: Maximus Yaney, New York, NY (US); Noah Fram-Schwartz, Greenwich, CT (US)

(73) Assignee: Roo, Inc., New York, NY (US)

( * ) Notice: Subject to any disclaimer, the term of this patent is extended or adjusted under 35 U.S.C. 154(b) by 297 days.

(21) Appl. No.: 15/259,675

(22) Filed: Sep. 8, 2016

(65) Prior Publication Data

US 2017/0115545 A1    Apr. 27, 2017

Related U.S. Application Data

(63) Continuation-in-part of application No. 15/244,632, filed on Aug. 23, 2016, now abandoned.

(51) Int. Cl.
| | |
|---|---|
| *G02F 1/153* | (2006.01) |
| *G03B 11/04* | (2006.01) |
| *H04N 7/18* | (2006.01) |
| *H04N 5/225* | (2006.01) |

(52) U.S. Cl.
CPC ......... *G03B 11/043* (2013.01); *H04N 5/2254* (2013.01); *H04N 7/181* (2013.01)

(58) Field of Classification Search
CPC .. G03B 11/043; G03B 17/565; G03B 11/048; G03B 7/00; G08B 13/19619; G02F 1/15; G02F 1/163; G02F 2201/44
See application file for complete search history.

(56) References Cited

U.S. PATENT DOCUMENTS

| | | |
|---|---|---|
| 5,240,636 A | 8/1993 | Doane et al. |
| 5,680,185 A | 10/1997 | Kobayashi et al. |
| 5,686,017 A | 11/1997 | Kobayashi et al. |
| 5,867,238 A | 2/1999 | Miller et al. |
| 6,261,659 B1 | 7/2001 | Kobayashi et al. |

(Continued)

OTHER PUBLICATIONS

Nuno A. Vaz, et al., A Light Control Film Composed of Liquid Crystal Droplets Dispersed in an Epoxy Matrix, Molecular Crystals and Liquid Crystals, 1987, pp. 17-34, vol. 146, Issue 1, Gordon and Breach Science Publishers, USA.

(Continued)

*Primary Examiner* — Joseph P Martinez
(74) *Attorney, Agent, or Firm* — Christopher V. Beckman

(57) ABSTRACT

An optical device, such as a camera, with an electrochromic lens cap is disclosed. The electrochromic lens cap is electrically switchable and thermally erasable and can reversibly and visibly change from an opaque state to a highly transparent state when a charge is applied to it. A power source such as a battery or photovoltaic cell can supply the charge. In addition, the electrochromic lens cap can reversibly change from an opaque state to a highly transparent state when there is a temperature change in the electrochromic lens cap's environment. The optical device has an actuator and/or transceiver that can communicate with a remote device to control when and how the charge is applied to the electrochromic lens cap to change it to the opaque state, color, pattern, or other feature. Another feature of this invention is using the electrochromic lens cap as a neutral-density filter for an optical device.

20 Claims, 5 Drawing Sheets

(56) References Cited

U.S. PATENT DOCUMENTS

| | | |
|---|---|---|
| 6,294,258 B1 | 9/2001 | Gentile |
| 6,306,469 B1 | 10/2001 | Serbutoviez et al. |
| 6,621,766 B2 | 9/2003 | Brewer et al. |
| 6,639,578 B1 | 10/2003 | Comiskey et al. |
| 6,866,887 B1 | 3/2005 | Chen et al. |
| 6,992,731 B1 * | 1/2006 | Morris ............... A61F 9/023 349/13 |
| 7,098,887 B2 | 8/2006 | Rezania |
| 7,166,851 B2 | 1/2007 | Sharma |
| 7,523,856 B2 | 4/2009 | Block et al. |
| 7,557,875 B2 | 7/2009 | Majumdar et al. |
| 7,639,571 B2 | 12/2009 | Ishii et al. |
| 7,659,595 B2 | 1/2010 | Masutani et al. |
| 7,667,786 B2 | 2/2010 | Nouchi et al. |
| 8,187,493 B2 | 5/2012 | Duponchel et al. |
| 8,223,217 B2 * | 7/2012 | Shurboff ............... G03B 9/08 348/222.1 |
| 8,537,308 B2 | 9/2013 | Hwang et al. |
| 8,677,515 B2 | 3/2014 | Ishihara et al. |
| 8,692,969 B2 | 4/2014 | Jang et al. |
| 2003/0134460 A1 | 7/2003 | Forbes et al. |
| 2009/0174918 A1 | 7/2009 | Zhuang et al. |
| 2009/0189981 A1 * | 7/2009 | Siann ............... H04N 7/183 348/143 |
| 2011/0199563 A1 | 8/2011 | Fontecchio et al. |
| 2014/0085574 A1 | 3/2014 | Kashima et al. |
| 2014/0141683 A1 | 5/2014 | Zhou |

OTHER PUBLICATIONS

Jeremy M. Wofford, et al., Holographic Polymer Dispersed Liquid Crystal (HPDLC) Transmission Gratings Formed by Invisible Light Initiated THIOL-ENE Photopolymerization (Postprint), Oct. 2006, Conference paper published in Proceedings of SPIE, vol. 6332, USA.

Chunye Xu, et al., Switchable Window Based on Electrochromic Polymers, Jul. 2004, J. Mater. Res., vol. 19, No. 7.

* cited by examiner

OPTICAL DEVICE WITH ELECTROCHROMIC LENS CAP

CROSS-REFERENCE TO RELATED APPLICATIONS

This application claims priority to U.S. patent application Ser. No. 15/244,632 filed on Aug. 23, 2016, entitled "Carrying Case with Electrochromic Panels," the entire enclosure of which is incorporated herein by reference.

FIELD OF THE INVENTION

This invention relates to the field of optical devices and security systems. More specifically, the present invention relates to an optical device with at least one electrochromic lens cap wherein the electrochromic lens cap can reversibly and visibly change from an opaque "off-state" to a highly transparent "on-state" when a user activates a button, switch, snap, voice command, remote device, dial, or toggle, triggers a proximity sensor, temperature sensor, timing device, or any other type of actuator, and/or when an environmental change such as a change in temperature and humidity, occurs.

BACKGROUND OF THE INVENTION

There are many types of optical devices in the marketplace, including but not limited to, security cameras, 360° cameras, high-speed cameras, and photography lenses. Many optical devices are able to record, transmit, and/or stream images and video upon activation of software or from a remote device. However, hacks on the optical device's software or the remote device's transmission can occur. Frequently, there is no light or other indicator to signal to the owner that the optical device is recording, transmitting, and/or streaming during these hacks and the unauthorized use of the optical device continues for extended periods.

The present invention solves the long-felt need of giving a user a visual cue regarding whether the optical device can record or stream an image or video without deactivating the optical device.

BRIEF DESCRIPTION OF THE DRAWINGS

This invention will be readily understood by the following detailed description in conjunction with the accompanying drawings, in which.

BRIEF SUMMARY OF THE INVENTION

Figure 1:
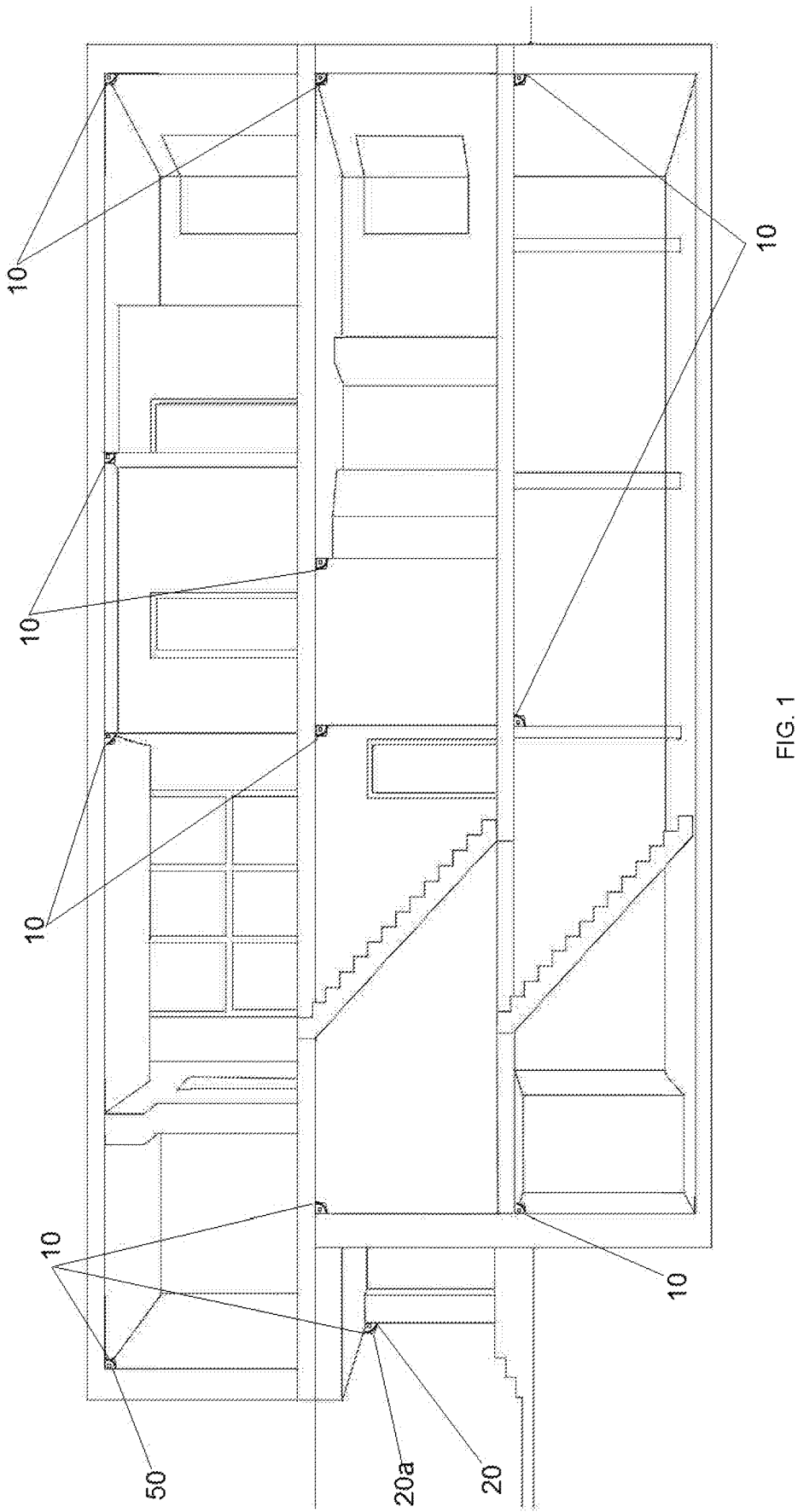
FIG. 1 is a cross-sectional side view of a multi-unit dwelling with multiple optical devices, each with an electrochromic lens covering.

With the advent of the internet of things (IoT), many households, warehouses, offices, and other dwellings have a multitude of appliances and electronic devices. Each appliance and/or device often has at least one optical device. Therefore, there is an increased need to protect oneself from unauthorized spying, recording, and/or viewing of images and video via these optical devices that can see every facet of a private and work space. An optical device such as a security camera or photographic lens can be remotely hacked to record, transmit, or stream a user's images without the user's knowledge. Therefore, there is an increasing need for a user to have an easy-to-implement mechanism to prevent the illicit recording or streaming of images using the optical device.

This invention relates to an optical device with at least one electrochromic lens that is electrically switchable and can reversibly and visibly change from an opaque "off-state" to a highly transparent "on-state" when a charge is applied to the at least one electrochromic lens. The charge can be activated by a remote device communicating with a transceiver on the optical device or by activating an actuator on the optical device or its environs.

A further aspect of this invention is to provide security to the user of any optical device or security system and prevent unauthorized use of the optical device or security system.

A further aspect of this invention is a lens filter on photography equipment. This includes creating an electrochromic filter and/or cover to prevent photosensitive materials such as film and works of art from light exposure which could cause distortion and/or discoloration.

The invention may be implemented in numerous ways, including, but not limited to, a system, device, apparatus, or method. Exemplary embodiments of the invention are discussed below.

In one embodiment of the present invention, a user can control multiple security cameras in a home, room, office, and/or warehouse. The user can activate a button on the camera and/or a remote device to make the electrochromic lens cap highly transparent and able to clearly view, transmit, stream, and/or record an image or series of images. Alternately, the user can activate a button and/or remote device to make the electrochromic lens cap opaque and unable to clearly view, transmit, stream, and/or record an image or series of images. When the electrochromic lens cap is in the opaque state, the optical lens is visibly cloudy and light does not pass through.

In another embodiment of the present invention, an optical device's electrochromic lens cap can optionally, reversibly, and visibly change from the opaque state to the highly transparent state. The user has the option of using a microphone, actuator, proximity sensor, timer, and/or transceiver which communicates to a remote device, to optionally change the opacity of the electrochromic lens cap. In another embodiment, the electrochromic lens cap is portable and can be taken on and off of the optical device or a series of optical devices.

Various aspects and advantages of the invention will become apparent from the following detailed description taken in conjunction with the accompanying drawings.

DETAILED DESCRIPTION OF THE INVENTION

This invention relates to an optical device that has at least one electrochromic lens cap that may reversibly and visibly change from opaque to highly transparent upon activation by a user.

The following is a non-limiting written description of embodiments illustrating various aspects of this invention. As used herein, the term "optical device" means any camera, visual, and/or still or video image recording, streaming, viewing, and/or transmitting device. The term optical device is considered to encompass any type, style, dimension, and/or form factor of, including but not limited to, an action camera, animation camera, autofocus camera, backup camera, banquet camera, box camera, bridge camera, camcorder, camera phone, closed-circuit television camera, compact camera, dashcam, digital camera, disposable camera, document camera, field camera, FireWire camera, folding camera, gun camera, helmet camera, high-speed camera, hidden camera, instant camera, IP camera, keychain camera, light-field camera, live-preview digital camera, medium format camera, mirrorless interchangeable-lens camera, monorail camera, movie camera, multiplane camera, omnidirectional camera, onboard camera, pinhole camera, pinspeck camera, plate camera, pocket camera, pocket video camera, point-and-shoot camera, pool safety camera, press camera, process camera, professional video camera, rapatronic camera, rangefinder camera, red light camera, reflex camera, remote camera, rostrum camera, Schmidt camera, single-lens reflex camera, spy cam, stat camera, stereo camera, still camera, still video camera, subminiature camera, system camera, thermal imaging camera, thermographic camera, toy camera, traffic camera, traffic enforcement camera, twin-lens reflex camera, video camera, view camera, virtual camera, webcam, Wright camera, zenith camera, and/or zoom-lens reflex camera.

The term "lens cap" is considered to encompass a type, style, dimension, and/or form factor of, including but not limited to, a covering, jacket, lid, mask, and/or sheath both removable from and stationary to any optical device.

A further aspect of the invention is for the electrochromic lens cap to have a colored hue when in the opaque and/or transparent state. It is further designed that the electrochromic lens cap can have multiple colors or change colors when in the opaque and/or transparent state. Alternatively, there can be multiple electrochromic lens caps layered on top of each other to create various effects, filters, or aesthetics.

The electrochromic lens cap is designed so a user can have the option to control the color and rate of the color change of the electrochromic lens cap using a variety of mechanisms, including but not limited to, varying the polarity, charge, frequency of charge applied, liquid crystal density, thickness, substrates that the liquid crystals are placed between, and/or substrate dyes or properties. Another feature of the invention is for the electrochromic lens cap to have varied textures, density, polarizations, holograms, and/or patterns.

The term "electrochromic lens cap" is considered to mean any type of electrochromic device (ECD) including those with suspended particles, liquid crystals, and electrochromics. An ECD is defined as an active material sandwiched between two electrodes. An electrochromic lens cap is considered synonymous with any ECD that can control the optical properties of the device, such as, but not limited to, optical transmission, absorption, reflection, and/or emittance in a continuous but reversible manner when the voltage or polarity to the electrochromic cells are changed.

In a preferred embodiment, the at least one electrochromic lens cap is made of a polymer dispersed liquid crystal (PDLC). In a preferred embodiment, the PDLC is designed so micro liquid crystalline droplets are dispersed in a polymer continuum. In an alternate embodiment, the at least one ECD is made of indium tin oxide (ITO) coated glass.

Both PDLC films and ITO coated glass are opaque in the off-state when there is no applied voltage or charge to the film or glass. In the off-state, when there is no charge applied, the liquid crystalline droplets are not aligned and not uniform. Light rays scatter on the various liquid crystalline droplets and the light scattering is not equivalent to the polymer's refractive index. Therefore the PDLC film and ITO coated glass will be opaque to a human viewer. When a charge is applied to the PDLC film, the liquid crystalline droplets within the polymer matrix align such that the film becomes highly transparent. The refractive index of the polymer and refractive index of the liquid crystalline droplets are equivalent, and thus the film is transparent to a human viewer. The degree of transparency depends on the thickness of the film, density, and/or number of liquid crystalline droplets dispersed in the polymer continuum and/or the substrate and any exterior EDC coating properties.

The PDLC or ITO should have at least two electric conductors connecting it to a power source. The at least two electrical conductors are connected to a power cable, which is connected to the power supply such as, but not limited to, a battery, photovoltaic cell, or DC power supply.

In a preferred embodiment, the power supply is a photovoltaic cell, such as a solar cell. In another embodiment, the power supply is a battery, and in another embodiment there are two power supplies, where one power supply is a photovoltaic cell and the other is a back-up battery.

In another aspect of the preferred embodiment the at least two electrical conductors are made out of a metal such as, but not limited to copper, aluminum, or silver. The metal can be brazed, oxidized, and/or anodized. In embodiments where the power supply is a photovoltaic cell, a diode is connected to the photovoltaic cell to prevent current from flowing back into the photovoltaic cell. In addition, an inverter is used to convert the DC power generated by the photovoltaic cell and/or battery to AC power for the purpose of applying a charge to the liquid crystalline droplets to change their state (or orientation) from on (transparent, aligned) to off (opaque, unaligned), and vice versa.

In another aspect of this invention, the optical device can have a locking mechanism connected to the electrochromic lens cap that prevents a charge on the electrochromic lens cap that would turn the lens cap transparent without the user's permission and/or knowledge. In a preferred embodiment, the locking mechanism is a fingerprint reader or other biometric sensor. In an alternative embodiment the locking mechanism can be a switch, toggle, snap, button, voice command, remote device, dial, timer, transceiver, or other adjuster that will prevent the electrochromic lens cap from transforming to the transparent state if not activated or permitted by the user. The remote device can be, but is not limited to, any smartphone or smart device, and/or computer program. The communication system with the electrochromic lens cap from the remote device can be, but is not limited to, broadband, Bluetooth, light-emitting diode (LED), ultra-wideband (UWB), wireless USB, fiber optics, Wi-Fi, Wi-Max, wireless broadband (WiBro), infrared (IrDA), radio frequency identification (RFID), near field communication (NFC), near field magnetic communication, HiperLAN, HIPERMAN, 802.20, power line communication (PLC), and/or ZigBee.

In another aspect of this invention, the optical device can have a proximity or motion sensor that automatically applies a charge to the electrochromic lens cap to align the crystals and make it transparent when a user or object is within a designated space.

In another aspect of this invention, the electrochromic lens cap can have a temperature adjustor or sensor that will cause the electrochromic lens cap to change from the opaque off-state to the highly transparent on-state. In addition, the electrochromic lens cap can be thermally erasable.

The at least one electrochromic lens cap can be any hue, pantone, color and/or tint. In a preferred embodiment, the at least one electrochromic lens cap is clear when in the transparent state. In embodiments where there are multiple electrochromic lens caps on an optical device, each electrochromic lens cap can be any color, pantone, hue, and/or tint in the opaque and/or transparent state.

Another feature of the present invention are electrochromic lens caps that have multiple electrical conductors. The multiple electrical conductors can change the polarity and/or voltage applied to the electrochromic lens cap at various points on the panel and at varying frequencies to make unique patterns, effects, logos, names, and/or emblems on each electrochromic lens cap. The multiple electrical conductors can also permit a predesignated portion of each electrochromic lens cap to be in the transparent state while other portions are opaque depending on the location of the electrical conductors and/or vice versa.

Another feature of the present invention is an electrochromic lens cap wherein the electrochromic material is a holographic polymer-dispersed liquid crystal (H-PDLC) or memory-type H-PDLC and wherein the device is also thermally erasable.

In another aspect of this invention, there is a remote, switch, snap, button, adjustor, and/or actuator that can control at least one of the electrochromic lens cap's reversible activation from opaque to transparent. There can be multiple actuators for each electrochromic lens cap or one actuator for all of the electrochromic lens caps. Additionally there can be one actuator to control the transforming of the electrochromic lens cap from opaque to transparent or vice versa and another actuator to control the frequency of the change, illumination device, locking mechanism, and/or voice control.

Alternatively, the optical device can have multiple electrochromic lens caps that are different shapes, sizes, dimensions, thicknesses, and/or form factors. Each electrochromic lens cap can be a different size, thickness, have different functions, and/or colors, hues, and/or tints in the opaque and/or transparent state.

In another aspect of this invention, the electrochromic lens cap can also have different textures, finishes, densities, and/or polarities. Additionally, the invention conceives of an electrochromic lens cap using various types of liquid crystals or nanocrystals.

In another aspect of this invention, there is a microphone in or on the exterior of the optical device. The microphone can control the reversible electrochromic lens caps switching from transparent to opaque, the frequency of the opacity change, and/or the locking mechanism preventing the electrochromic lens caps from becoming transparent at inopportune times or without owner consent.

In another aspect of this invention, there is a remote device that can control the electronic switching of the at least one electrochromic lens cap, the frequency of the transformation, locking mechanism, timing, and/or other features such as color, emblem, or logo display on the at least one electrochromic lens cap.

An additional aspect of this invention includes the ability to swap, replace, and/or add different electrochromic lens caps on different optical devices. Alternatively, a user can have a colored, tinted, patterned, and/or textured electrochromic lens cap and swap, replace, and/or add a different electrochromic lens cap to the optical device.

In another aspect of the invention, the electrochromic lens cap can be used as a filter, such as a neutral-density (ND) filter over the optical lens of an optical device. In addition, the electrochromic lens cap can be used in other optical devices to prevent photosensitive films from exposure to light in a darkroom. The electrochromic lens cap's opacity changes can function as a shutter, or filter using coloring, textures, holograms, or any other effects of the electrochromic lens cap as described herein.

In a further aspect of this invention, the at least one electrochromic lens cap can be used on any type of large, medium, or small appliance, carpentry or cabinet, and/or textile. It is conceived that an electrochromic lens cap with the features, colors, textures, and activations set forth herein can be used on any type of device or appliance such as, but not limited to: an air conditioner, air ionizer, appliance plug, boiler, beverage opener, can opener, ceiling fan, clothes dryer, combo washer dryer, convection oven, dishwasher, fan, garbage disposal unit, grill, hairdryer, hair iron, heater, humidifier, HVAC system, icebox, iron, kettle, kimchi refrigerator, lamp, microwave oven, mirror, mousetrap, oil heater, oven, radiator, refrigerator, server, sewing machine, steamer, stove, sump pump, tie press, toaster, vacuum cleaner, washing machine, water cooker, window fan, or television.

It is further conceived that the electrochromic lens cap can be used on/as a panel for furniture doors or drawers, clothing or textiles, glasses, camping equipment, tablets, and/or mobile phones.

DETAILED DESCRIPTION OF THE EMBODIMENTS

This invention is designed such that an optical device can have an interchangeable and electrically switchable electrochromic lens cap covering the optical lens. Each electrochromic lens cap can have various colors, hues, densities, sizes, orientations, and/or surface finishes.

FIG. 1 is a cross-sectional side view of a multi-unit dwelling, with a plurality of optical devices 10, each with an optical lens 20. Each optical lens 20 has an electrochromic lens cap 20a that can reversibly change from the opaque state to the highly transparent state upon activation of an actuator 50 or a remote device (not shown).

Figure 2:
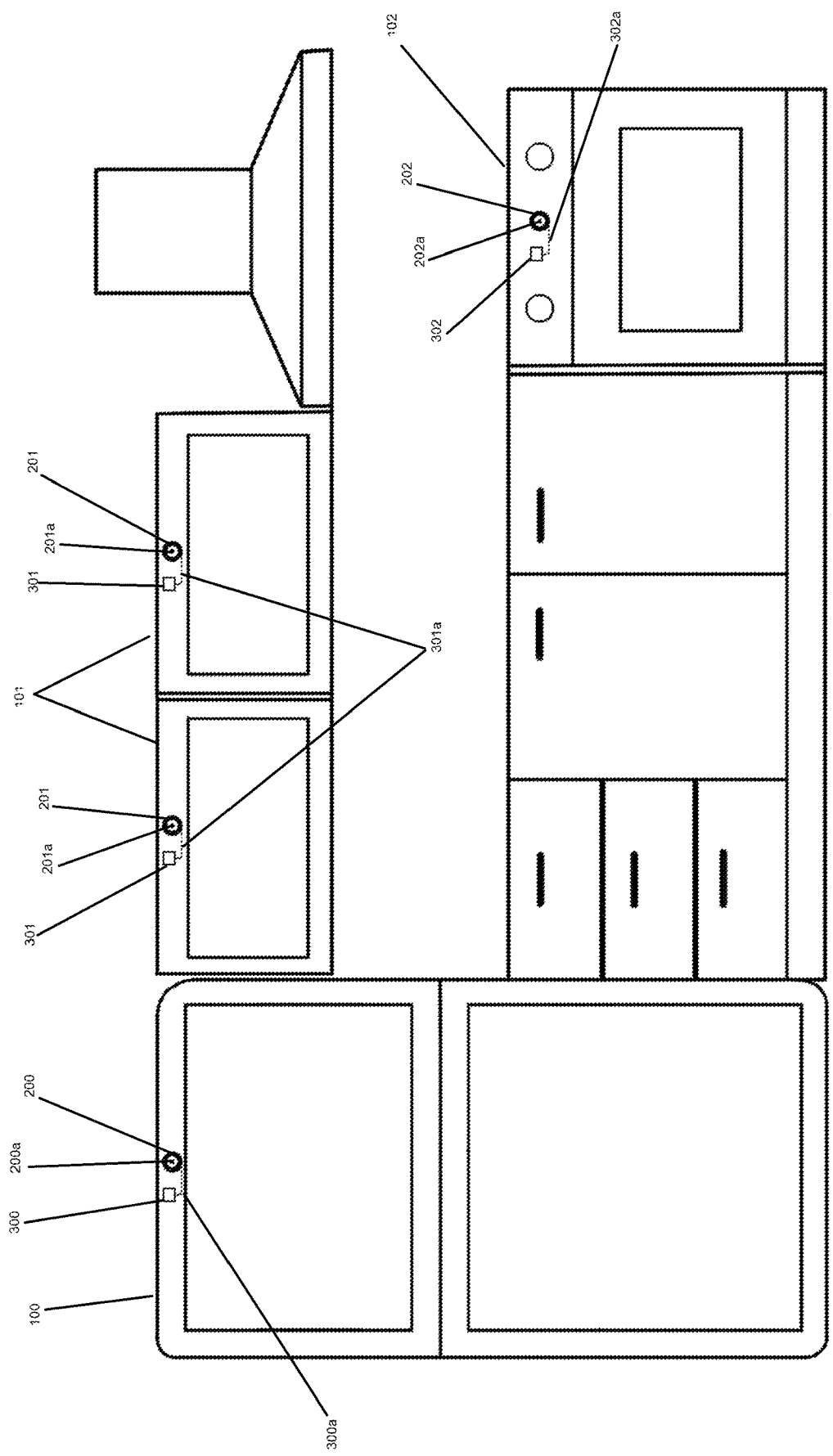
FIG. 2 is a front view of a room with multiple appliances and cabinets, each with a separate optical device, and each optical device having an electrochromic lens cap.

FIG. 2 is a front view of a kitchen with multiple appliances, including a refrigerator 100, a plurality of cabinets 101, and an oven 102. The refrigerator 100, cabinets 101, and oven 102 each has an optical device with an optical lens 200, 201, and 202, respectfully. Each optical device with an optical lens 200, 201, and 202 has an electrochromic lens cap 200a, 201a, and 202a that can reversibly change from the opaque state to the highly transparent state upon activation of an actuator (not shown) or by communication received from a remote device (not shown). In addition, each electrochromic lens cap 200a, 201a, and 202a has a power source 300, 301, and 302. Each power source 300, 301, and 302 is connected to each electrochromic lens cap 200a, 201a, and 202a via a power cable 300a, 301a, and 302a, respectfully. Each power cable 300a, 301a, and 302a is affixed to each electrochromic lens cap 200a, 201a, and 202a with at least two electrical conductors (not shown).

Figure 3:
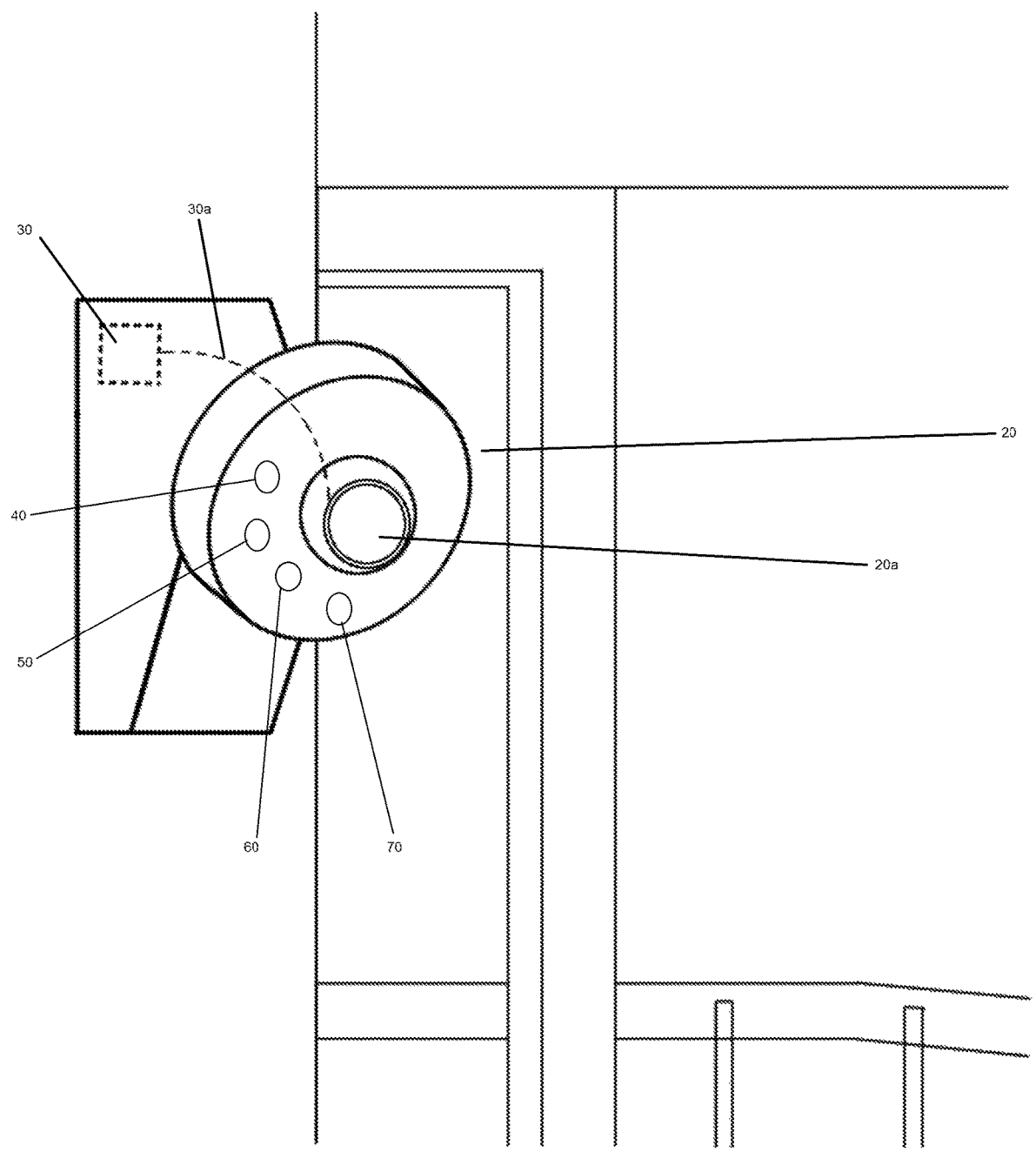
FIG. 3 is a perspective view of a security camera with an electrochromic lens covering mounted on a wall.

FIG. 3 is a perspective view of a security camera 20 with an electrochromic lens cap 20a mounted on a wall. The electrochromic lens cap 20a is electrically switchable and can reversibly change from the opaque state to the highly transparent state upon activation by a microphone 40, actuator 50, transceiver 60 able to communicate with a remote device such as a computer or mobile phone, and/or proximity sensor 70. The electrochromic lens cap 20a can reversibly change state when a charge is applied. The charge can be applied by a power source 30 connected to a power cable 30a and at least two electrical conductors (not shown).

Figure 4:
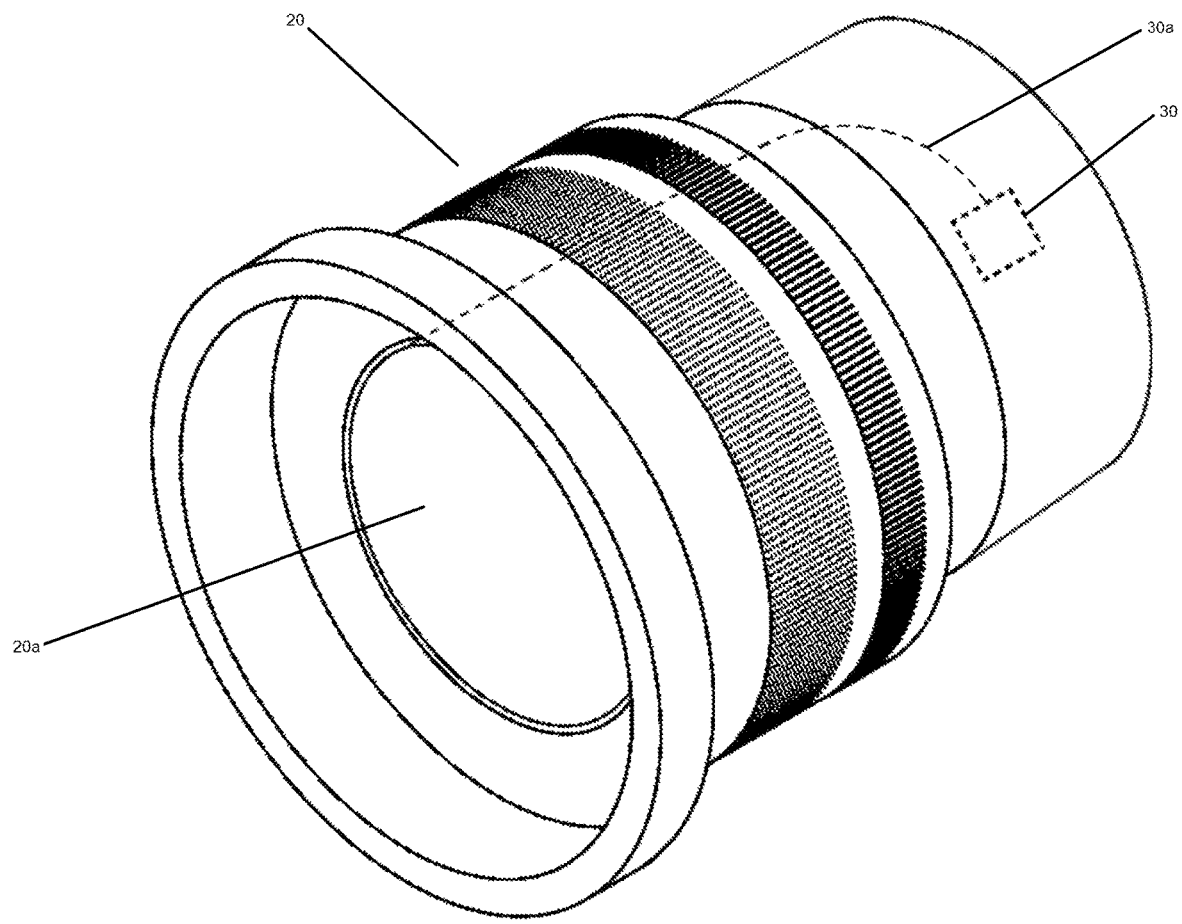
FIG. 4 is a perspective view of a camera lens with an electrochromic lens cap.

FIG. 4 is a perspective view of a camera lens 20 with an electrochromic lens cap 20a. The electrochromic lens cap 20a can have a charge applied to it to reversibly change the opacity of the electrochromic lens cap 20a by a power source 30 attached to a power cable 30a which is attached to the electrical conductors (not shown).

Figure 5:
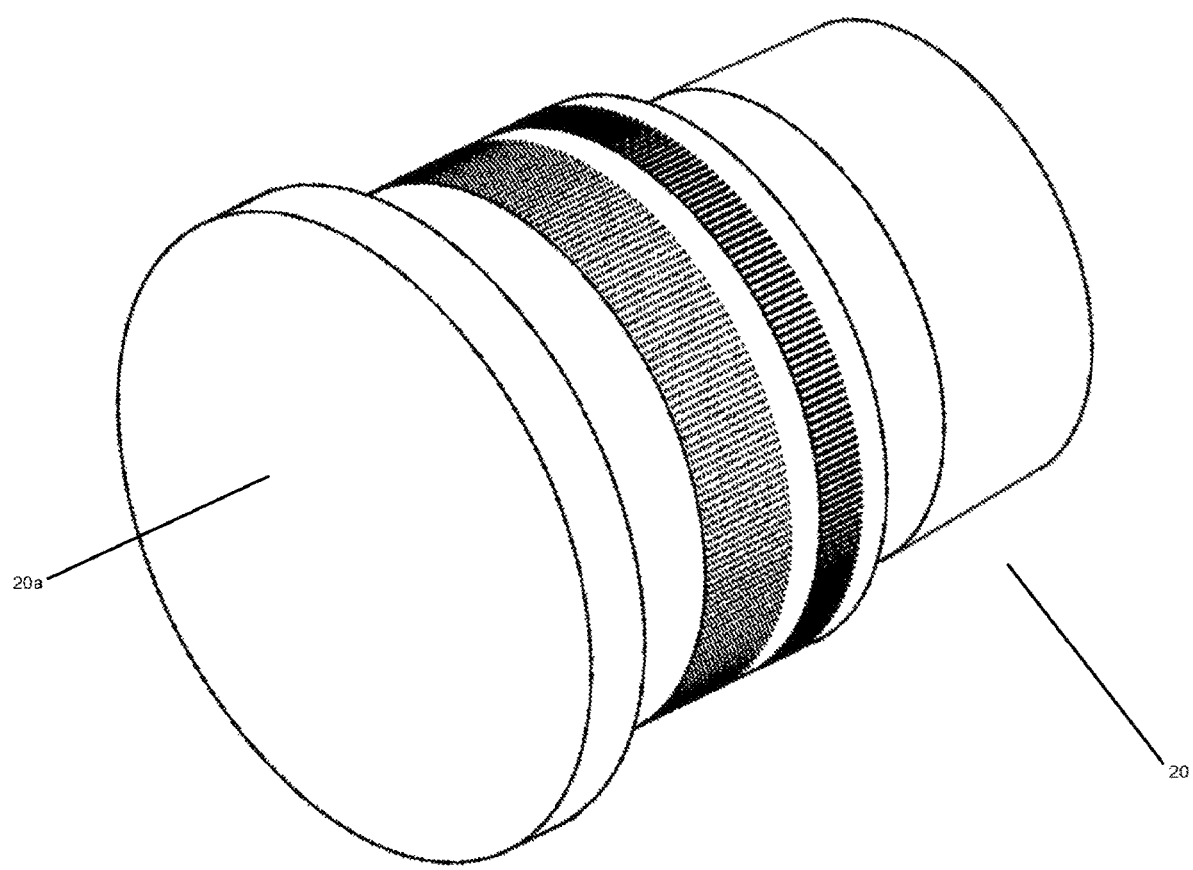
FIG. 5 is a perspective view of a camera lens with a portable electrochromic lens cap.

FIG. 5 is a perspective view of a camera lens 20 with a portable electrochromic lens cap 20a. The electrochromic lens cap 20a can optionally be removed from the end of the camera lens 20.

Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified.

What is claimed:

1. A camera with an optical lens, the optical lens having an exterior covering wherein the covering is at least one electrochromic film that is electrically switchable between two states affecting image formation within said camera, which two states are a first, thoroughly opaque state, in which light does not pass through the optical lens, and a second, highly transparent state, when a charge is applied to the at least one electrochromic film, and wherein the presence of at least one of the two states is confirmed with a visible indicator;
   wherein said visible indicator is a patterned hue; and
   wherein said electrochromic film forms said visible indicator.

2. The camera with an optical lens of claim 1, wherein the at least one electrochromic film is a PDLC film or indium tin oxide (ITO) coated glass.

3. The camera with an optical lens of claim 1 or claim 2, wherein the at least one electrochromic film has said patterned hue in the thoroughly opaque state.

4. The camera with an optical lens of claim 1, wherein the at least one electrochromic film has at least two electrical conductors that can apply a charge to the at least one electrochromic film, a power cable attached to the at least two electrical conductors, and at least one power source attached to the power cable.

5. The camera with an optical lens of claim 4, wherein the at least one power source is a battery.

6. The camera with an optical lens of claim 4 or claim 5, wherein the at least one power source is a photovoltaic cell.

7. The camera with an optical lens of claim 4 or claim 5, wherein the camera has a transceiver which can be activated to apply the charge to the at least one electrochromic film.

8. The camera with an optical lens of claim 7, wherein the transceiver can communicate with Bluetooth, ultra-wideband (UWB), wireless USB, Wi-Fi, Wi-Max, wireless broadband (WiBro), infrared (lrDA), radio frequency identification (RFID), near field communication (NFC), near field magnetic communication, HiperLAN, HIPERMAN, 802.20, power line communication (PLC), and ZigBee.

9. The camera with an optical lens of claim 1 or claim 4, wherein the camera has a microphone that can be activated to apply or remove a charge from the at least one electrochromic film.

10. The camera with an optical lens of claim 1 or claim 4, wherein the camera has a proximity sensor that can be activated when a user is within a predefined area to apply or remove a charge from the at least one electrochromic film.

11. The camera with an optical lens of claim 1 or claim 4, wherein the camera has an actuator on the camera that can be activated by a user to apply or remove a charge from the at least one electrochromic film.

12. A camera with an optical lens, the optical lens having:
   a removable exterior covering wherein the covering has at least one electrochromic film that is electrically switchable between two states affecting image formation within said camera, which two states are a first, thoroughly opaque state, in which light does not pass through the optical lens, and a second, highly transparent state, when a charge is applied to the at least one electrochromic film, and wherein the presence of at least one of the two states is confirmed with a visible indicator,
   wherein said visible indicator is a patterned hue, and wherein said electrochromic film forms said visible indicator;
   at least two electrical conductors that can apply a charge to the at least one electrochromic film;
   a power cable attached to the at least two electrical conductors; and
   at least one power source attached to the power cable.

13. The camera with an optical lens of claim 12, wherein the at least one electrochromic film is a PDLC film or indium tin oxide (ITO) coated glass.

14. The camera with an optical lens of claim 12 or claim 13, wherein the at least one electrochromic film has said patterned hue in the thoroughly opaque state.

15. The camera with an optical lens of claim 12 or claim 13, wherein the camera has a transceiver which can be activated to apply and remove the charge to the at least one electrochromic film.

16. The camera with an optical lens of claim 15, wherein the transceiver can communicate with Bluetooth, ultra-wideband (UWB), wireless USB, Wi-Fi, Wi-Max, wireless broadband (WiBro), infrared (lrDA), radio frequency identification (RFID), near field communication (NFC), near field magnetic communication, HiperLAN, HIPERMAN, 802.20, power line communication (PLC), and ZigBee.

17. A security system comprising a plurality of cameras, each with an optical lens, each optical lens having an exterior covering wherein the covering has at least one electrochromic film that is electrically switchable between two states affecting image formation within said camera, which two states are a first, thoroughly opaque state, in which light does not pass through the optical lens, and a second, highly transparent state, when a charge is applied to the at least one electrochromic film, wherein the presence of at least one of the two states is confirmed with a visual indicator, wherein said visible indicator is a patterned hue, and wherein said electrochromic film forms said visible indicator.

18. The security system of claim 17, wherein each of said cameras has a transceiver which can be activated to apply and remove the charge to the at least one electrochromic film and the transceiver can communicate with Bluetooth, ultra-wideband (UWB), wireless USB, Wi-Fi, Wi-Max, wireless broadband (WiBro), infrared (lrDA), radio frequency identification (RFID), near field communication (NFC), near field magnetic communication, HiperLAN, HIPERMAN, 802.20, power line communication (PLC), and ZigBee.

19. The security system of claim 17 or claim 18, wherein the at least one electrochromic film is a PDLC film or indium tin oxide (ITO) coated glass.

20. The security system of claim 17 or claim 18 wherein each of said cameras has at least two electrical conductors that can apply a charge to the at least one electrochromic film, a power cable attached to the at least two electrical conductors, and at least one power source attached to the power cable.

* * * * *